(12) United States Patent
Zhang et al.

(10) Patent No.: US 7,082,312 B2
(45) Date of Patent: Jul. 25, 2006

(54) SHORT MESSAGE GATEWAY, SYSTEM AND METHOD OF PROVIDING INFORMATION SERVICE FOR MOBILE TELEPHONES

(75) Inventors: Jianming Zhang, Beijing (CN); Song Song, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 690 days.

(21) Appl. No.: 09/874,089

(22) Filed: Jun. 5, 2001

(65) Prior Publication Data

US 2002/0019243 A1 Feb. 14, 2002

(30) Foreign Application Priority Data

Jun. 15, 2000 (CN) .............................. 00 1 18371

(51) Int. Cl.
*H04Q 7/20* (2006.01)

(52) U.S. Cl. .................. 455/466; 455/445; 455/422; 455/433; 455/435; 455/566

(58) Field of Classification Search ............... 455/466, 455/412.1, 414.1, 414.3, 445, 422, 433, 569, 455/575, 435, 566; 709/218, 216, 217, 219
See application file for complete search history.

(56) References Cited

U.S. PATENT DOCUMENTS

| | | | | |
|---|---|---|---|---|
| 5,537,474 A | * | 7/1996 | Brown et al. ................ | 380/248 |
| 5,604,921 A | | 2/1997 | Alanara ......................... | 455/45 |
| 5,719,918 A | * | 2/1998 | Serbetciouglu et al. ..... | 380/271 |
| 5,768,509 A | * | 6/1998 | Gunluk ......................... | 709/203 |
| 5,794,142 A | | 8/1998 | Vanttila et al. .............. | 455/419 |
| 5,822,700 A | | 10/1998 | Hult et al. ................... | 455/466 |
| 6,188,909 B1 | * | 2/2001 | Alanara et al. .............. | 455/466 |
| 6,415,156 B1 | * | 7/2002 | Stadelmann ................. | 455/466 |
| 6,459,904 B1 | * | 10/2002 | Lorello et al. .............. | 455/466 |
| 6,560,456 B1 | * | 5/2003 | Lohtia et al. ................ | 455/445 |
| 6,677,894 B1 | * | 1/2004 | Sheynblat et al. ........ | 342/357.1 |
| 6,718,178 B1 | * | 4/2004 | Sladek et al. ............... | 455/466 |
| 2002/0187774 A1 | * | 12/2002 | Ritter et al. ................. | 455/414 |

FOREIGN PATENT DOCUMENTS

| | | |
|---|---|---|
| EP | 0722240 | 12/1995 |
| EP | 0 851 696 A2 | 7/1998 |
| EP | 851696 A2 * | 7/1998 |
| EP | 0 926 911 A2 | 6/1999 |
| EP | 0989712 | 9/1999 |
| JP | 10200966 | 7/1998 |
| JP | 01188743 | 7/2001 |
| WO | WO9741654 | 11/1997 |
| WO | WO9811744 | 3/1998 |
| WO | 9741654 | 4/1998 |
| WO | 9856195 | 6/1998 |
| WO | WO9847270 | 10/1998 |
| WO | WO9856195 | 12/1998 |

* cited by examiner

*Primary Examiner*—Joseph Feild
*Assistant Examiner*—Julio Perez
(74) *Attorney, Agent, or Firm*—F. Chau & Associates, LLC

(57) ABSTRACT

A short message service gateway (120), comprising: a short message interfacing device (126,127) for receiving/sending short messages from/to outside of the short message service gateway (120); a short message service engine (121), in response to a request for information service included in a short message received by the short message interfacing device, for requesting the information service from at least one application server (110) and receiving result of the information service, and then sending the result of the information service back to the short message interfacing device in a form of short message.

11 Claims, 6 Drawing Sheets

SHORT MESSAGE GATEWAY, SYSTEM AND METHOD OF PROVIDING INFORMATION SERVICE FOR MOBILE TELEPHONES

BACKGROUND OF THE INVENTION

1. Technical Field

This invention relates to the system and method of providing information service for mobile device, particularly the system and method of providing information service for mobile telephones having the function of short message service.

2. Discussion of the Related Art

People usually hope to obtain information at all times and places and enjoy certain information service. Radio paging system and mobile telephone system meet such demand to a certain extent, but their functions are still limited.

Mobile telephones with short message service (SMS) functions have been quite popularized. Short message service is a specific function of modern cellular telephone system. It enables the users of cellular communication network to send messages to other users or receive text messages from other users. Whenever a mobile telephone is logged on the network, the short message service function always tries to transmit message thereto, even when said mobile telephone is in progress of voice or data call. Mobile telephones having short message service functions can also browse through the whole network and still send and receive messages. Mobile telephones equipped with short message service functions provide the users with the method of receiving, reading, editing, deleting, sending and saving messages.

In the prior art, the aforesaid mobile telephones with short message service functions can only exchange short messages between each other, and such exchange of short messages requires the short message service center to participate in. The short message service center ensures not only to drop out messages but ensures the quality of message transmission even if the mobile telephone is not turned on or located out of the service area.

Although the mobile telephone having short message service function expands the use of mobile telephone, people are still unable to make use of such mobile telephone to request complex information service. For example, it is unable to receive/send E-mails, unable to inquire database, etc.

SUMMARY OF THE INVENTION

An object of this invention is to provide a system and method of providing information service by making use of short messages, so that users of mobile telephones with short message service functions can enjoy certain information service at all times and places.

To fulfill the aforesaid object, this invention provides a short message service gateway, comprising:

a short message interfacing device for receiving/sending short messages from/to outside of the short message service gateway;

a short message service engine, in response to a request for information service included in a short message received by the short message interfacing device, for requesting the information service from at least one application server and receiving result of the information service, and then sending the result of the information service back to the short message interfacing device in a form of short message.

This invention further provides a system of providing information service for mobile telephones, comprising:

at least one application server, for receiving requests for information service, and providing results of the information service;

at least one short message center, for forwarding short messages from/to the mobile telephones;

characterized by further comprising:

a short message service gateway, comprising:

a short message center interface for receiving /sending short messages from/to said at least one short message center;

a short message service engine, in response to a request for information service included in a short message received by the short message center interface, for requesting the information service from said at least one application server and receiving result of the information service, and then sending the result of the information service back to the short message center interface in a form of short message.

This invention further provides a system of providing information service for mobile telephones, comprising:

at least one application server, for receiving requests for information service, and providing results of the information service;

at least one short message apparatus, for forwarding short messages from/to the mobile telephones;

characterized by further comprising:

a short message service gateway comprising a short message daemon, for receiving/sending short messages from/to said at least one short message apparatus;

a short message service engine, in response to a request for information service included in a short message received by the short message daemon, for requesting the information service from said at least one application server and receiving result of the information service, and then sending the result of the information service back to the short message daemon in a form of short message.

This invention further provides a method of providing information service for mobile telephones, characterized by comprising steps of:

a) receiving a short message from a mobile telephone;

b) fetching an information service code from the short message;

c) according to the information service code, getting results of the information service from at least one application server; and d) combining the results of the information service into a short message and sending the short message to the mobile telephone.

According to the system or method of this invention, users of mobile telephones can enjoy information service at all times and places. The system of this invention is compatible with mobile telephones of different short message service centers and different systems, thus meeting the needs of various information services.

BRIEF DESCRIPTION OF THE DRAWINGS

The foregoing and other objects, features, and advantages of this invention are apparent from the following detailed description taken in conjunction with the accompanying drawings, in which.

DETAILED DESCRIPTION OF THE PREFERRED EMBODIMENTS

Preferred embodiments of this invention is described in detail below in association with the attached figures.

Figure 1:
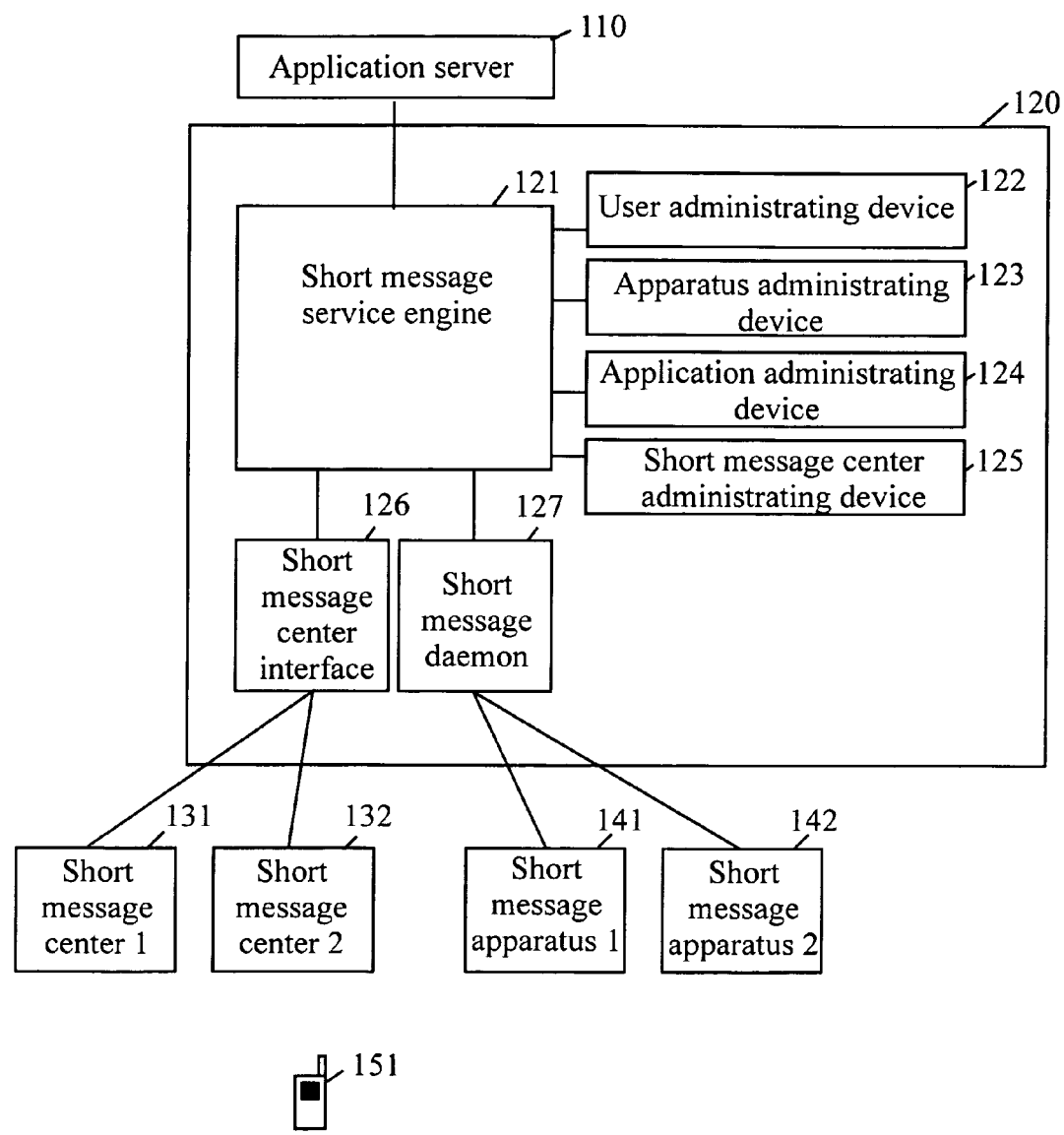
FIG. 1 is a block diagram of the system of providing information service for mobile telephones according to this invention.

FIG. 1 is a block diagram of a system of providing information service for mobile telephones according to this invention. Label 110 of FIG. 1 shows an application server. In this invention, a plurality of application servers can provide corresponding information service in response to a received request for information service. In FIG. 1 only one application server 110 is shown as an example.

Label 120 shows a short message service gateway. As shown in FIG. 1, the short message gateway 120 includes a short message service engine 121. The short message service engine 121, for example, can receive a short message from a mobile telephone 151 through a short message center (as described later). Of course, it can also receive a short message 151 from a mobile telephone through a daemon described later. An information service code is included in the short message. The short message service engine 121 identifies the information service code in the short message and requests information service from different application servers (for example the application server 110) according to different information service codes. After receiving the result of information service sent back from the application server 110, the short message service engine 121 packs the result of information service in the short message and sends said short message to the mobile telephone.

The short message sent by the mobile telephone 151 to the short message service engine 120, for example, can be in this format: "sc# request", in which sc is the service code.

For example, if an E-mail of a subject "subject" and body "body" is sent to "somebody@cn.ibm.com", then the short message can be:

10#somebody@cn.ibm.com#subject#body in which the service code is "10", showing a request for E-mail service, and the contents of service is "somebody@cn.ibm.com#subject#body". This format is defined by the application program of E-mail service. When the short message service gateway 120 receives the aforesaid message, it will request to converse "somebody@cn.ibm.com#subject#body"

to SMTP according to service code "10", then sends it to the E-mail server. At last, the E-mail server completes the mail delivery.

For another example, to obtain the weather forecast of Beijing area, the short message can be:

20#010 in which the service code is "20", showing a request for weather forecast, and the contents of service is "010", namely the weather forecast of Beijing area. When the short message service gateway receives the aforesaid short message, it will request to send "010" to the weather information server according to the service code "20". The weather information server sends back the weather status which is transmitted to the mobile telephone by the short message service gateway 120.

E-mail service can be provided by default of the short message gateway 120. The short message service gateway 120 can check the electronic mailbox of the mobile telephone user and transmit the contents of the mail to the mobile telephone. The mobile telephone user can also send a short message to answer the E-mail, and even obtain more data contents and make database inquiry.

The communication between the application server 110 and the short message engine 121 can utilize various protocols in present technology, for example SMTP, SNPP, PAP and the protocol based on HTTP. To improve the security of data communication, SSL can be utilized.

Besides, some service programs can also be run on the short message service gateway 120. These programs provide certain information services for the mobile telephone users. Under this condition, the application server 110 and the short message gateway 120 are physically the same computer.

The application server 110 can not only transmit message to the short message gateway 120, but also obtain message status from the short message gateway 120. When the short message gateway 120 receives a request, it can transmit a message status report to the application server. The message status supported by the short message service gateway 120 can comprise, for example: suspend, transmitted to short message center, transmitted to mobile telephone, transmission error, etc.

The exchange of short messages between the short message service gateway 120 and the mobile telephone 151 can incorporate two methods.

The first method. In the short message service gateway 120 sets up a short message center interface 126, which can communicate with a plurality of existing short message centers 131, 132 etc. Short message can be sent to the mobile telephone 151 through short message centers 131, 132 or received from the mobile telephone 151. Using dedicated line or dial-up network to link the short message center interface 126 and the short message center 131, 132. The communication between them can utilize different communication protocols such as TCP/IP, X2.5, CIMD, EMI, SMPP, etc.

In the case of the first method, a short message center administrating device 125 can be set up in the short message service gateway 120, for administrating a plurality of short message centers 131,132 supported by the short message gateway 120 according to the short message center profile. By modification of the short message center profile, the support for new short message centers can be augmented.

To provide support for a plurality of short message centers, the short message center interfaces are defined as follows:

1. UINT OpenConnectiion (CONNECTIONPARAMETER cp) /* Open connection */
2. BOOL ServiceLogin (UINT socket, SERVICEINFO si) /* Service login */
3. BOOL User PIN (UINT socket, USERINFO ui) /* Send PIN number */
4. BOOL HoldUntil (UINT socket, TIMEINFO ti) /* Timing service */
5. UINT SendMsg (UINT socket, MESSAGE msg, OPTION opt) /* Send message */
6. UINT CheckNewMsg (UINT socket) /* Check new message */

7. UINT GetNewMsg (UINT socket, USERINFO* ui, MESSAGE* msg, TIMEINFO* ti) /* Get new message */

8. UINT GetMsgStatus (UINT socket, USERINFO ui, UINT msgid) /* Check message status */

9. UINT CheckMsgStatusChanges (UINT socket) /* Check message status changes */

10. BOOL GetMsgStatusChanges (UINT socket, UserInfo* ui, UINT* msgid, UINT* status)

11. BOOL EndConnection (UINT socket) /* End connection */

The aforesaid first method applies to large enterprises and supports large-amount transactions.

The second method: running a short message daemon 127 in the short message service gateway 120 for intercepting at least one short message apparatus 141, 142 connected with the short message service gateway 120. The short message apparatus 141, 142, etc. are any apparatus having short message functions in present technology, for example a mobile telephone. The short message daemon 127 incorporates RS-232 serial interface, infrared data transfer interface or any other available interface for data communication with short message apparatus 141, 142, etc. to receive or send short messages. When the short message daemon 127 communicates with a plurality of short message apparatus, it is necessary to balance the load to improve performance. The short message daemon incorporates AT command to control the work mode of the short message apparatus, comprising BLOCK mode, TEXT mode, PDU mode, etc.

Besides, to improve the performance of the short message service gateway 120, the short message service gateway 120 can also include the following devices.

User administrating device 122 is used for administrating a plurality of users logged in the short message gateway 120 according to the user profile. The user profile stores personal options such as mobile telephone number of the user, model of the mobile telephone, short message center (namely the short message service supplier) personal hobby, personal address book, personal abbreviation, personal subscription list, etc. According to the user profile, the short message service gateway 120 provides the user with personalized service, comprising: personal message abbreviation, message transmission option, personal address book, personal command definition, etc.

Since short message is limited in length and mobile telephones of different models and different trademarks have different features, the short message service gateway 120 provides a function of abbreviating personal message according to user characteristics, for example language transformation, personal message abbreviation, etc. Personal message abbreviation enables the user to input an abbreviated statement to replace a longer key input.

Apparatus administrating device 123 is used for administrating various mobile telephones supported by the short message gateway 120 according to the apparatus profile. The apparatus profile stores relevant information such as a screen size of a radio telephone, a character set, having STK function or not, being able to process multiple languages or not, etc.

Application administrating device 124 is used for administrating various application servers 110 according to the application profile. The application profile can store the service codes and the definition of request format provided by various application servers.

Short message center administrating device 125 is used for administrating various short message centers 131, 132 supported by the short message gateway 120 according to the short message center profile.

All the aforesaid administration work can be accomplished through the World Wide Web supported by the short message service gateway 120.

In addition to the aforesaid mode of providing requested information service, the service request of the user can also be previously stored in the short message service gateway 120, namely to be subscribed. Thus, the short message gateway 120 will provide subscribed information services such as the weather forecast, the current prices of stocks, etc. for the mobile telephone according to the subscribed time.

If the user can remember different service codes, then it is not necessary to make any change in the program of the mobile telephone. of course, to provide more friendly user interface, the user can also run the menu selection program and select required service items according to the menu.

Besides, STK (SIM toolbox) can also be used to modify the user interface for providing subscribed menu and providing system encryption function.

Figure 2:
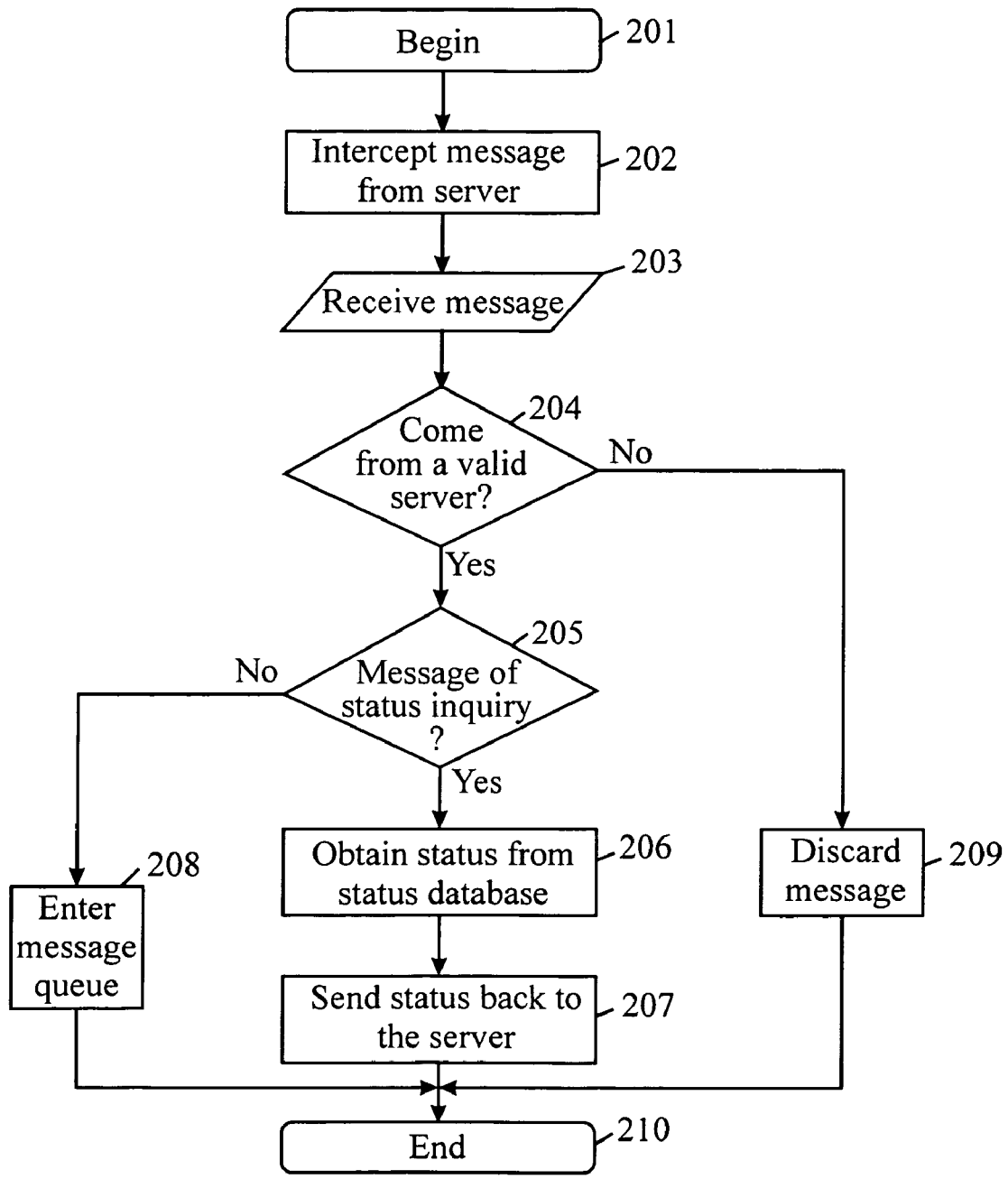
FIG. 2 is a flowchart showing the short message service gateway in FIG. 1 receiving a message from the application server.

FIG. 2 is a flowchart of the short message service gateway receiving a message from the application server. In step 201, the procedure begins. In step 202, intercept a message from the application server. If in step 203 receive a message from the application server, then the flow enters step 204. In step 204, judge whether the received message comes from an valid application server. If the result of judgement of step 204 is "yes", then the flow enters step 205. Otherwise, it enters step 209. In step 205, judge whether the received message is a message of status inquiry. If the result of judgement of step 205 is "yes", then the flow enters step 206. Otherwise, It enters step 208.

In step 206, obtain a status information from the status database. In step 207, the obtained status information is sent back to the application server.

In step 208, the received message is entered the message queue.

In step 209, discard the received message.

After steps 207, 208 and 209, the flow can return to step 202 and intercept continuously the message from the application server. If the termination condition is met, then the flow turns to step 210. The procedure is terminated.

Figure 3:
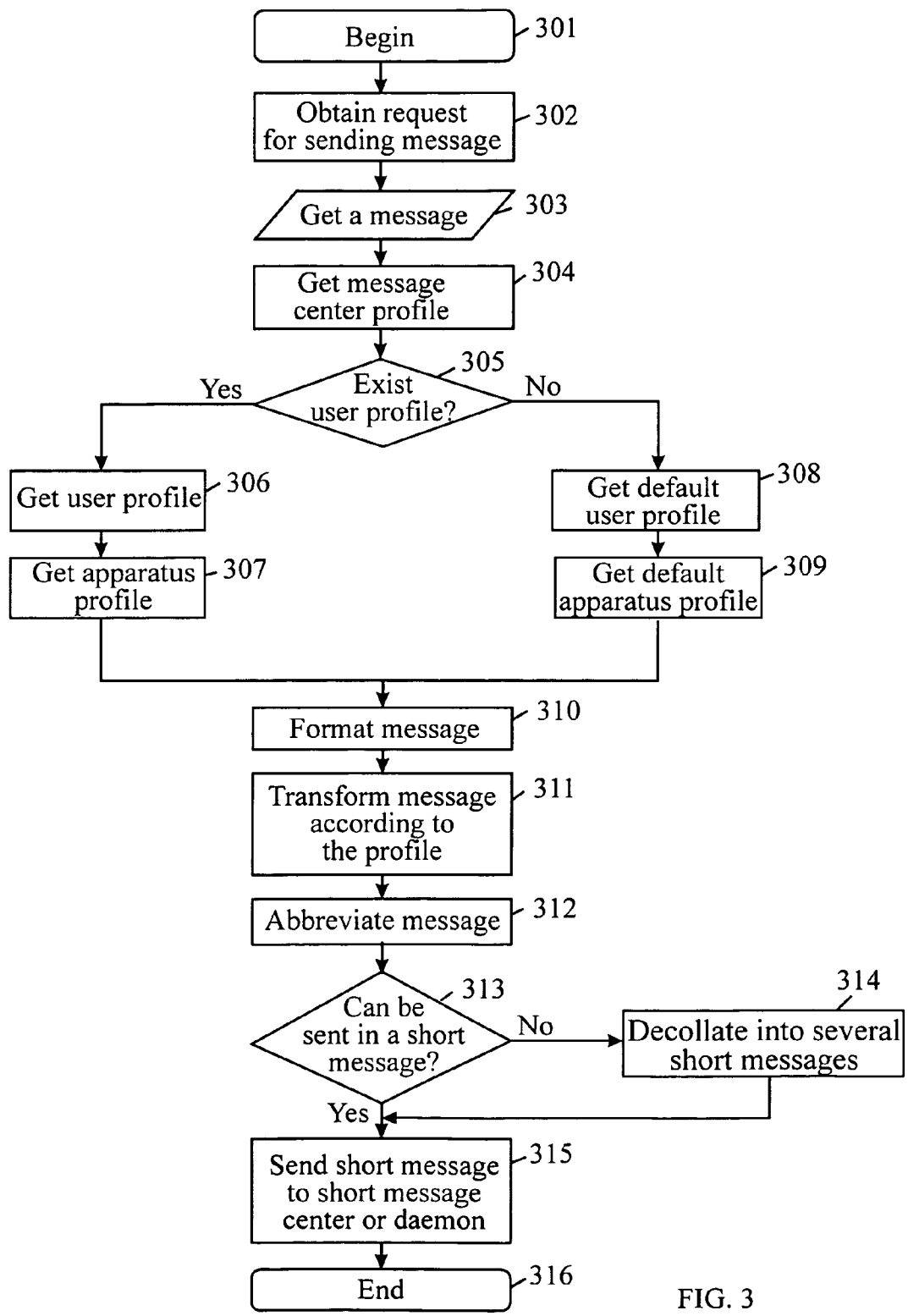
FIG. 3 is a flowchart of sending a message out of the short message service gateway.

FIG. 3 is a flowchart of sending a message to outside of the short message service gateway. In step 301, the procedure begins. In step 302, obtain a request for sending a message. If in step 303 get a message, then the flow enters step 304. In step 304 get the message center profile. Afterwards, in step 305, judge whether there exists a user profile. If the result of judgement of step 305 is "yes", then obtain the user profile and the apparatus profile in step 306 and step 307 respectively. If the result of judgement of step 305 is "no", then obtain the default user profile and the default apparatus profile in step 308 and step 309 respectively.

Afterwards, in step 310, format the message. In step 311, transform the message according to various profiles. In step 312, abbreviate the message.

Afterwards, in step 313, judge whether the aforesaid processed message can be sent in a short message center. If the result of judgement of step 313 is "no", then turn to step 314 for decollating the message to be sent into several shorter messages. Otherwise, in step 315, send the short message back to the short message center or the daemon. After that, the procedure returns to step 302, waiting for the next request for sending. If the termination condition is met, in step 316 the procedure is terminated.

Figure 4:
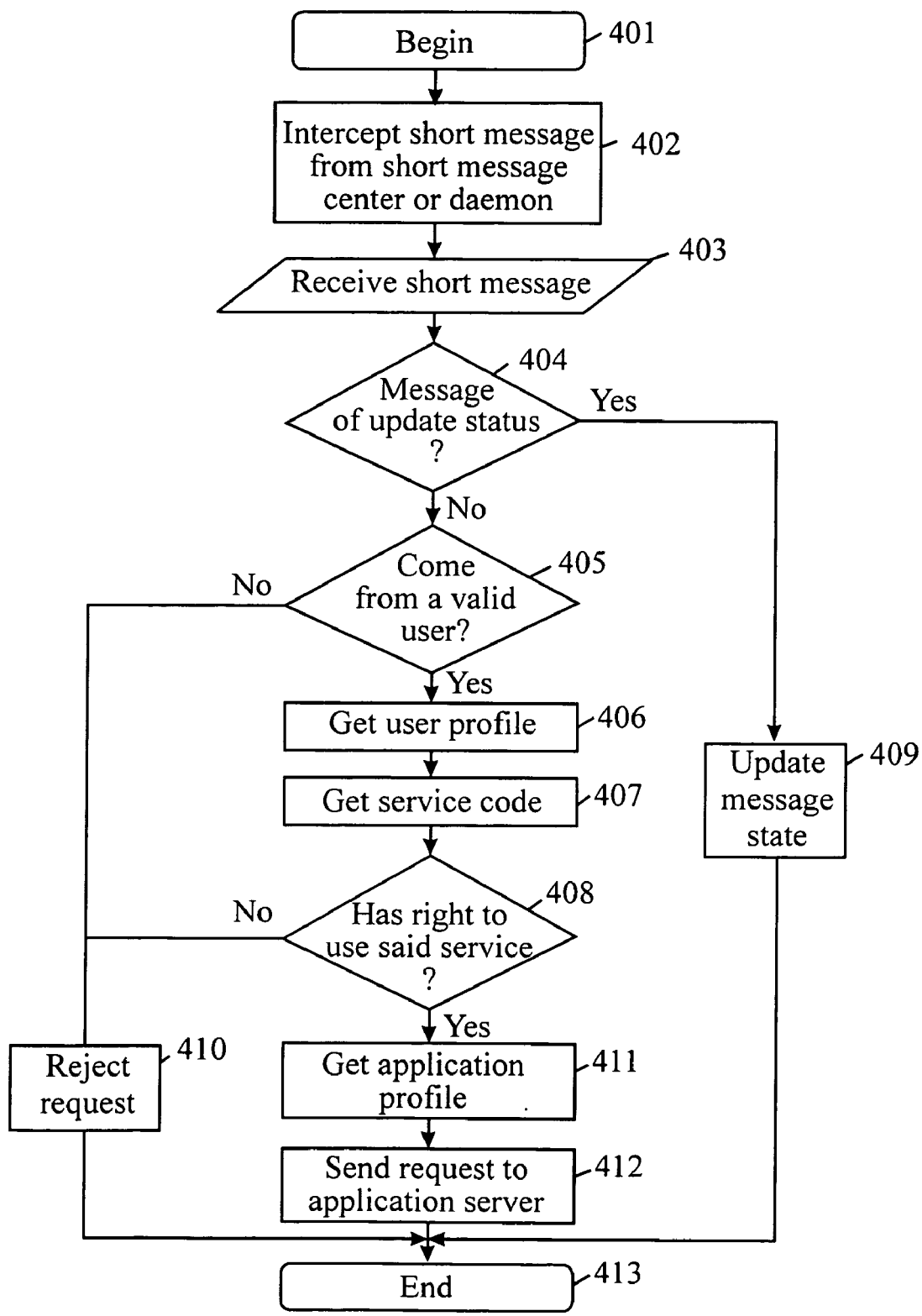
FIG. 4 is a flowchart of receiving a message from out of the short message service gateway.

FIG. 4 is a flowchart of receiving a message from outside of the short message service gateway. In step 401, the procedure begins. In step 402, intercept a short message from the short message center or the daemon. If in step 403 receive a short message, then the procedure enters step 404. In step 404, judge whether the received short message is a message of update status. If the result of judgement of step 404 is "yes", then turn to step 409. Otherwise, proceed to step 405.

In step 405, judge whether said message comes from an valid user. If the result of judgement of step 405 is "no", then turn to step 410. Otherwise, proceed to step 406.

In step 406, get the user profile. In step 407, get the service codes included in the short message. Afterwards, in step 408, judge whether said user has the right to use the requested service. If the result of judgement of step 408 is "yes", then turn to step 411. Otherwise, turn to step 410.

In step 409, update the message status. Then turn to step 413.

In step 411, get the application profile. In step 412, send the request to the application server. Afterwards, proceed to step 413.

In step 410, reject the request. Afterwards, proceed to step 413.

In step 413, the procedure is terminated. If not wishing to terminate the procedure, return to step 402, waiting for the next short message.

Figure 5:
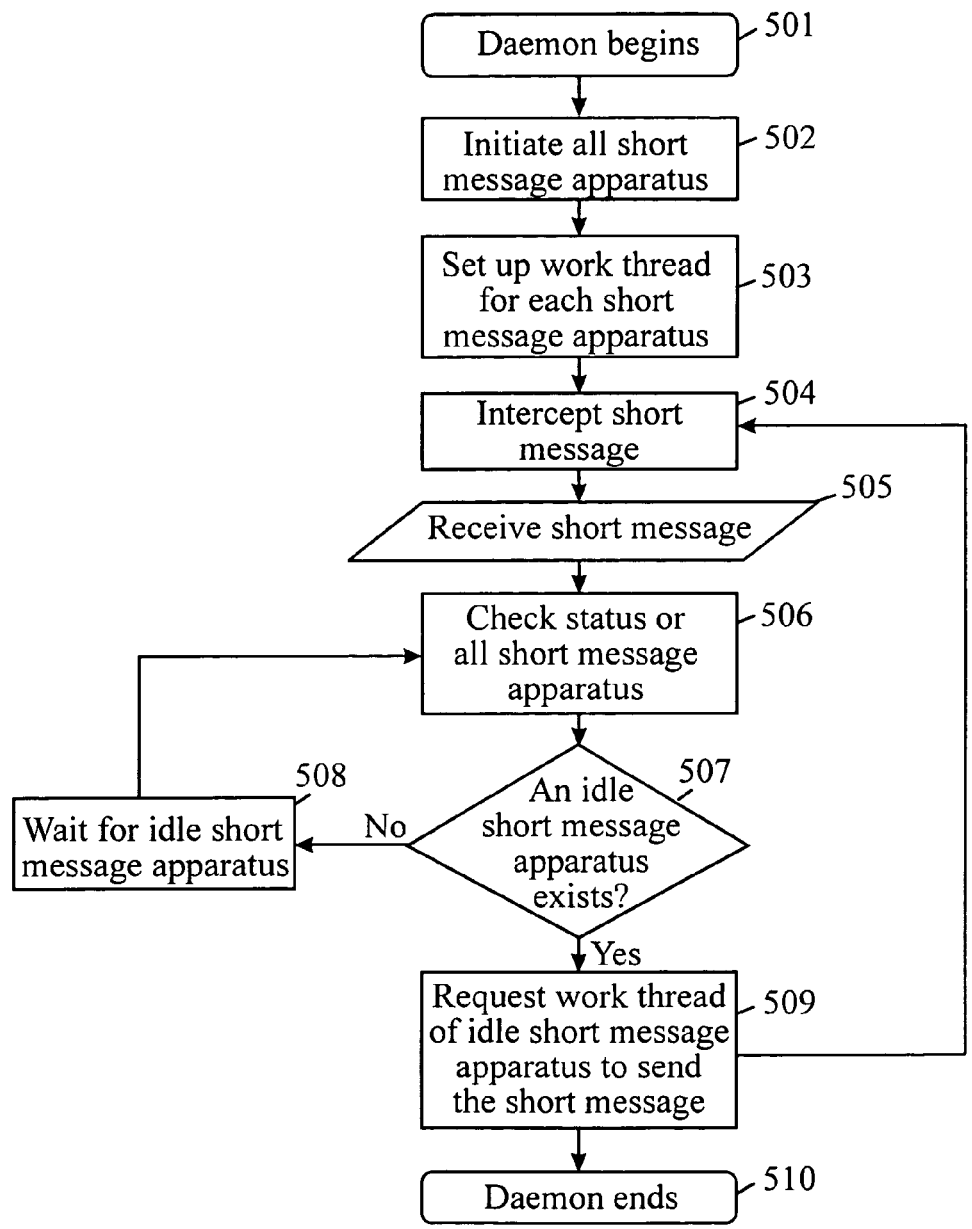
FIG. 5 is a flowchart showing a short message daemon sending a message.

FIG. 5 is a flowchart of the short message daemon sending a message. In step 501, the daemon begins. In step 502, initiate all the short message apparatus. In step 503, set up a work thread for each short message apparatus. In step 504, intercept the short message. If in step 505 receive a short message, then in step 506 check the status of all the short message apparatus. Afterwards, in step 507, judge whether there exists an idle short message apparatus. If the result of judgement of step 507 is "no", then turn to step 508. In step 508, wait for an idle short message apparatus. If the result of judgement of step 507 is "yes", then proceed to step 509. In step 509, request the work thread of the idle short message apparatus to send the short message. After that, if the termination condition is met, then proceed to step 510, the daemon is terminated. Otherwise return to step 504, intercepting the next short message.

Figure 6:
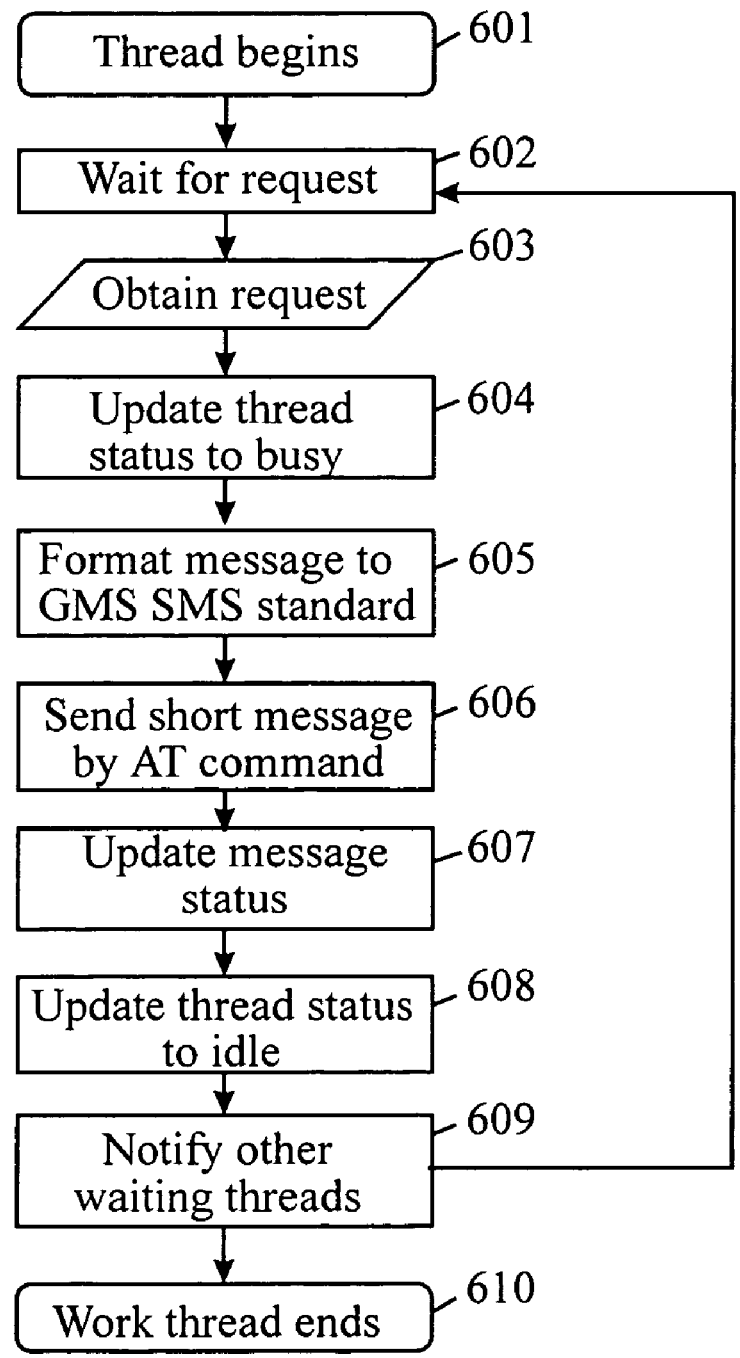
FIG. 6 is a flowchart showing a work thread sending a short message.

FIG. 6 is a flowchart of the work thread sending a short message. In step 601, the thread begins. In step 602, wait for a request. If in step 603 obtain a request, then proceed to step 604. In step 604, update the thread status to busy. Afterwards, in step 605, format the message to GSM short message service (SMS) standard. Afterwards, in step 606, send the short message by AT command. In the following step 607, update the message status. In step 608, update the thread status to idle. In step 609, notify the other waiting threads. At this time, if not requiring the thread to terminate, then the thread returns to step 602, waiting for the next short message. If requiring the termination of the thread, then proceed to step 610. The thread is terminated.

Although embodiments of implementing this invention has been shown and described in detail, it should be known that various variations and modifications can be made for this invention without departing from the scope of claim of rights.

What is claimed is:

1. A system of providing information service for mobile telephones, comprising:
   at least one application server, for receiving requests for information service, and providing results of the information service;
   at least one short message apparatus, for forwarding short messages from/to the mobile telephones;
   characterized by further comprising:
   a short message service gateway comprising:
      a short message daemon, for receiving/sending short messages from/to said at least one short message apparatus; and
      a short message service engine, in response to a request for information service included in a short message received by the short message daemon, for requesting the information service from said at least one application server and receiving result of the information service, and then sending the result of the information service back to the short message daemon in a form of short message.

2. The system according to claim 1, characterized in that the short message service gateway further comprises:
   user administrating device, for administrating a plurality of users based on a user profile.

3. The system according to claim 1, characterized in that the short message service gateway further comprises:
   an apparatus administrating device, for administrating a plurality types of mobile telephones based on an apparatus profile.

4. The system according to claim 1, characterized in that the short message service gateway further comprises:
   an application administrating device, for administrating a plurality of application servers based on an application profile.

5. The system according to claim 1, characterized in that the short message service engine, based on items of information service for which a user has subscribed, requests the information service from said at least one application server and receives the result of the information service, and then sends the result of the information service back to the short message daemon in a form of short message.

6. A method of providing information service for mobile telephones, characterized by comprising steps of:
   a) receiving a personal key input from a mobile telephone;
   b) transforming the personal key input into a short message, the short message comprising an information service code;
   c) extracting the information service code from the short message;
   d) based on the information service code, retrieving results of the information service from at least one application server; and
   e) combining the results of the information service into a short message and sending the short message to the mobile telephone.

7. The method according to claim 6, characterized in that said steps b) and e) are performed by way of short message apparatus.

8. The method according to claim 6, characterized by further comprising a step of obtaining the information service code based on items of the information service for which a use has subscribed, without performing said steps a), b) and c).

9. The method of claim 6, wherein the step of receiving a personal key input from a mobile telephone comprises:
   receiving an abbreviated form of the short message from a mobile telephone.

10. The method of claim 6, wherein the step of receiving a personal key input from a mobile telephone comprises:
    receiving a personal key input from a mobile telephone, wherein the personal key input is in a language different than the short message.

11. The system according to claim 1, wherein the at least one short message apparatus comprises a graphical user menu for graphically requesting the information service in lieu of entering a service code.

* * * * *

(12) INTER PARTES REEXAMINATION CERTIFICATE (0425th)
United States Patent
Zhang et al.

(10) Number: US 7,082,312 C1
(45) Certificate Issued: Aug. 14, 2012

(54) SHORT MESSAGE GATEWAY, SYSTEM AND METHOD OF PROVIDING INFORMATION SERVICE FOR MOBILE TELEPHONES

(75) Inventors: Jianming Zhang, Beijing (CN); Song Song, Beijing (CN)

(73) Assignee: Sybase 365, LLC

Reexamination Request:
No. 95/001,288, Apr. 13, 2010

Reexamination Certificate for:
Patent No.: 7,082,312
Issued: Jul. 25, 2006
Appl. No.: 09/874,089
Filed: Jun. 5, 2001

(30) Foreign Application Priority Data
Jun. 15, 2000 (CN) .......................... 00 1 18371

(51) Int. Cl.
*H04Q 7/20* (2006.01)

(52) U.S. Cl. .............. 455/466; 455/422.1; 455/433; 455/435.1; 455/445; 455/566

(58) Field of Classification Search ................. None
See application file for complete search history.

(56) References Cited

To view the complete listing of prior art documents cited during the proceeding for Reexamination Control Number 95/001,288, please refer to the USPTO's public Patent Application Information Retrieval (PAIR) system under the Display References tab.

*Primary Examiner* — Charles Craver

(57) ABSTRACT

A short message service gateway (120), comprising: a short message interfacing device (126,127) for receiving/sending short messages from/to outside of the short message service gateway (120); a short message service engine (121), in response to a request for information service included in a short message received by the short message interfacing device, for requesting the information service from at least one application server (110) and receiving result of the information service, and then sending the result of the information service back to the short message interfacing device in a form of short message.

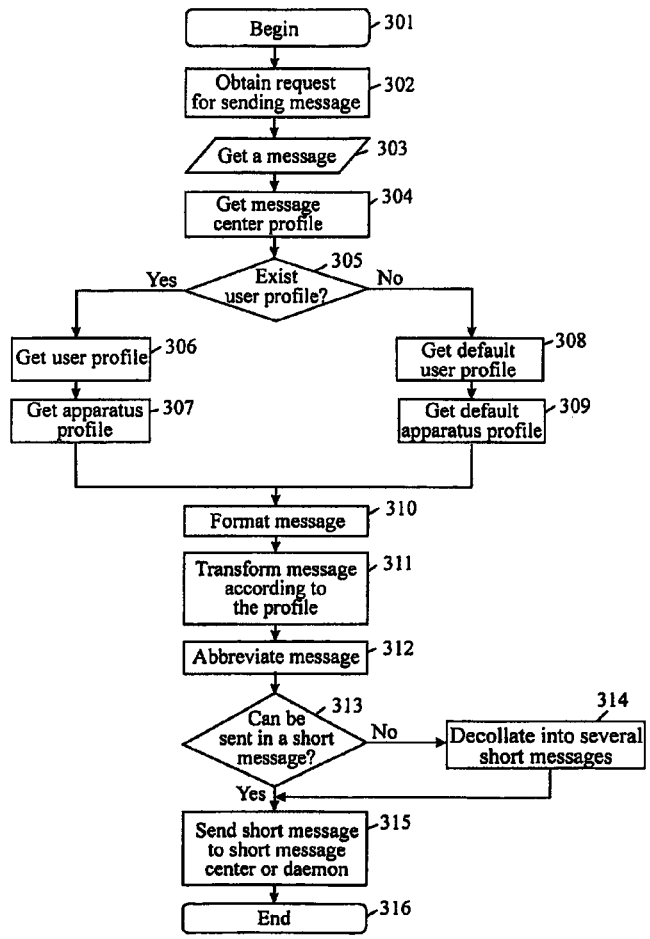

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-5, 8 and 11 is confirmed.

Claims 6, 7, 9 and 10 are cancelled.

New claims 12-21 are added and determined to be patentable.

*12. A method of providing information service for mobile telephones, characterized by comprising steps of:*
  *a) receiving a personal key input from a mobile telephone;*
  *b) transforming the personal key input into a short message, the short message comprising an information service code;*
  *b2) receiving the short message via a short message daemon in a short message service gateway;*
  *c) extracting the information service code from the received short message;*
  *d) based on the information service code, retrieving results of the information service from at least one application server; and*
  *e) combining the results of the information service into a short message and sending the short message from the short message service gateway to the mobile telephone via the short message daemon.*

*13. The method according to claim 12, characterized in the said steps b) and e) are performed by way of short message apparatus.*

*14. The method according to claim 12, characterized by further comprising a step of obtaining the information service code based on items of the information service for which a use has subscribed, without performing said steps a), b) and c).*

*15. The method of claim 12, wherein the step of receiving a personal key input from telephone comprises:*
  *receiving an abbreviated form of the short message from a mobile telephone.*

*16. The method of claim 12, wherein the step of receiving a personal key input from a mobile telephone comprises:*
  *receiving a personal key input from a mobile telephone, wherein the personal key input is in a language different than the short message.*

*17. A method of providing information service for mobile telephones, characterized by comprising steps of:*
  *a) receiving a personal key input from a mobile telephone;*
  *b) transforming the personal key input into a short message, the short message comprising an information service code;*
  *c) extracting the information service code from the short message;*
  *d) based on the information service code, retrieving results of the information service from at least one application server;*
  *e) combining the results of the information service into a short message and sending the short message to the mobile telephone; and*
  *f) obtaining the information service code based on items of the information service for which a user has subscribed, without performing said steps a), b) and c).*

*18. The method according to claim 17, characterized in that said steps b) and e) are performed by way of short message apparatus.*

*19. The method of claim 17, wherein the step of receiving a personal key input from a mobile telephone comprises:*
  *receiving an abbreviated form of the short message from a mobile telephone.*

*20. The method of claim 17, wherein the step of receiving a personal key input from a mobile telephone comprises:*
  *receiving a personal key input from a mobile telephone, wherein the personal key input is in a language different than the short message.*

*21. The method of claim 12, wherein receiving the short message via the short message daemon in the short message service gateway further comprises:*
  *intercepting the short message in the short service gateway independent of the information service code.*

\* \* \* \* \*